United States Patent
Kaliski, Jr.

(10) Patent No.: US 10,153,905 B2
(45) Date of Patent: Dec. 11, 2018

(54) HASH-BASED ELECTRONIC SIGNATURES FOR DATA SETS SUCH AS DNSSEC

(71) Applicant: VERISIGN, INC., Reston, VA (US)

(72) Inventor: Burton S. Kaliski, Jr., McLean, VA (US)

(73) Assignee: VERISIGN, INC., Reston, VA (US)

(*) Notice: Subject to any disclaimer, the term of this patent is extended or adjusted under 35 U.S.C. 154(b) by 221 days.

(21) Appl. No.: 14/959,281

(22) Filed: Dec. 4, 2015

(65) Prior Publication Data
US 2017/0163425 A1    Jun. 8, 2017

(51) Int. Cl.
  *H04L 9/32* (2006.01)
  *H04L 29/12* (2006.01)
  *H04L 29/06* (2006.01)

(52) U.S. Cl.
  CPC .......... *H04L 9/3247* (2013.01); *H04L 9/3239* (2013.01); *H04L 9/3242* (2013.01); *H04L 61/1511* (2013.01); *H04L 61/6004* (2013.01); *H04L 63/123* (2013.01)

(58) Field of Classification Search
  CPC ............. H04L 61/6004; H04L 61/1511; H04L 9/3242; H04L 9/3247; H04L 9/32; H04L 9/3236
  See application file for complete search history.

(56) References Cited

U.S. PATENT DOCUMENTS

| | | | |
|---|---|---|---|
| 5,016,274 A | 5/1991 | Micali et al. | |
| 6,085,320 A * | 7/2000 | Kaliski, Jr. | ............. G06F 21/33 713/168 |
| 6,097,811 A | 8/2000 | Micali | |
| 6,301,659 B1 | 10/2001 | Micali | |
| 2008/0260160 A1* | 10/2008 | Moreau | ............ H04L 29/12066 380/277 |
| 2012/0117621 A1* | 5/2012 | Kondamuru | ...... H04L 29/12066 726/3 |
| 2012/0284505 A1* | 11/2012 | Smith | ................. H04L 61/1511 713/151 |

(Continued)

OTHER PUBLICATIONS

Extended European Search Report dated Apr. 18, 2017, European Application No. 16202042.4, pp. 1-7.

(Continued)

*Primary Examiner* — Shewaye Gelagay
*Assistant Examiner* — Amie C. Lin
(74) *Attorney, Agent, or Firm* — MH2 Technology Law Group, LLP (57) ABSTRACT

Techniques for electronically signing DNS records stored in a zone file for an internet DNS zone are presented. The techniques include electronically accessing a plurality of DNS resource records of a DNS zone stored on one or more DNS servers of a distributed DNS database; generating a plurality of leaf nodes from the plurality of DNS resource records; constructing a recursive hash tree from the plurality of leaf nodes, where the recursive hash tree includes a plurality of nodes including a root node and the plurality of leaf nodes, where each node of the plurality of nodes includes either a leaf node or a hash of data including child nodes; storing the root node in a DNS key resource record for a zone signing key for the zone; and publishing, in a DNS resource record signature resource record, validation data including path data from the recursive hash tree.

18 Claims, 8 Drawing Sheets

(56) References Cited

U.S. PATENT DOCUMENTS

| | | | |
|---|---|---|---|
| 2014/0282887 A1* | 9/2014 | Kaminsky | H04L 61/1511 |
| | | | 726/4 |
| 2016/0197898 A1* | 7/2016 | Hozza | H04L 63/0442 |
| | | | 713/168 |

OTHER PUBLICATIONS

Burton S. Kaliski, Jr., "Rethinking Adoption of Hash Signatures", ETSI 2nd Quantum-Safe Cryptography Workshop, Oct. 6, 2014, pp. 1-18.

R. Arends et al., "Resource Records for the DNS Security Extensions", Network Working Group RFC 1717, Internet Society, 2005, pp. 1-29.

Michael Szydlo, "Recent Improvements in the Efficient Use of Merkle Trees: Additional Options for the Long Term", RSA Laboratories, Mar. 10, 2004, Retrieved from the Internet: http://www.emc.com/emc-plus/rsa-labs/historical/recent-improvements-efficient-use-merkle-trees.htm, pp. 1-2.

Bernstein et al., "SPHINCS: practical stateless hash-based signatures," In Annual International Conference on the Theory and Applications of Cryptographic Techniques. Springer, 2015, 33 pages.

Bindel et al., "Transitioning to a Quantum-Resistant Public Key Infrastructure," May 24, 2017. http://eprint.iacr.org/2017/460, pp. 1-27.

Buchmann et al., "XMSS—A Practical Forward Secure Signature Scheme based on Minimal Security Assumptions," In International Workshop on Post-Quantum Cryptography. Springer, 2011, pp. 1-26.

Cooper et al., "Internet X.509 Public Key Infrastructure Certificate and Certificate Revocation List (CRL) Profile," May 2008, pp. 1-151.

Ducas et al., "Lattice Signatures and Bimodal Gaussians," In Advances in Cryptology: CRYPTO 2013, ResearchGate, pp. 40-56, Springer, 2013.

Laurie et al., "IETF RFC 6962: Certificate Transparency," Jun. 2013, 27 pages.

McGrew et al., "Hash-Based Signatures, Internet-Draft draft-mcgrew-hash-sigs-06," Mar. 5, 2017, pp. 1-44.

Merkle, "Secrecy, Authentication and Public Key Systems," Standford University Technical Report No. 1979-1, Jun. 1979, pp. 1-182.

Nakamoto, "Bitcoin: A Peer-to-Peer Electronic Cash System," 2008, pp. 1-9.

OASIS, Security Assertion Markup Language (SAML) 2.0, Mar. 15, 2005, 66 pages.

Pavlovski et al., "Efficient Batch Signature Generation Using Tree Structures," International Workshop on Cryptographic Techniques and E-Commerce, CrypTEC. vol. 99. 1999, 8 pages.

Santesson et al, "IETF RFC 6960: X.509 Internet Public Key Infrastructure Online Certificate Status Protocol—OCSP Abstract," Jun. 2013, pp. 1-41.

Even et al., "On-line/off-line digital signatures." In Advances in Cryptology: Crypto' 89, pp. 263-277. Springer, 1990.

Kocher, "On certificate revocation and validation." In Financial Cryptography, Springer, 1998.

* cited by examiner

HASH-BASED ELECTRONIC SIGNATURES FOR DATA SETS SUCH AS DNSSEC

FIELD OF THE INVENTION

This invention relates generally to securing the domain name system (DNS) against future cryptanalysis, such as operational practical quantum computers.

BACKGROUND OF THE INVENTION

A cryptographic hash (or simply "hash" or "fingerprint") is typically a function that can input any of a variety of computer-interpretable objects and output a fixed-size string, e.g., a hexadecimal number. Cryptographic hashes typically have other useful properties such as preimage resistance (or "irreversibility") and collision resistance.

"Asymmetric cryptography" refers to traditional cryptography that utilizes a "key pair" consisting of a "public key" and a "private key". A message may be encrypted by applying an encryption algorithm under control of the public key to a message, and an encrypted message may be decrypted by applying a conjugate decryption algorithm and under control of the private key to the encrypted message. Asymmetric cryptography includes such well-known algorithms as the Rivest-Shamir-Adleman (RSA) technique, as well as the Diffie-Hellman family of techniques. Notably, the security of such asymmetric cryptography typically relies on the difficulty of solving certain algebraic problems using standard computers.

A conventional digital signature, or simply "signature", is typically the result of applying a private key of an asymmetric cryptographic key pair to a computer-interpretable object. The corresponding public key is published or otherwise made available by the signing entity to the verifying party. The object may first be hashed as part of the signature process. A verifying party can verify the signature by applying the public key to the signature and comparing the result to the object or the hash of the object, or otherwise by determining that the signature corresponds to the object or its hash, depending on the scheme. If the comparison results in a match, then the signature is valid; otherwise it is invalid. Digital signatures typically confer authentication (i.e., binding the signed object to the signer), non-repudiation (i.e., assuring that the signed object was indeed signed by the signing entity), and object integrity (i.e., assuring that the signed object has not changed since being signed). The process of "validating" a signature confirms that the aforementioned properties hold for the signed object. A public/private key pair that supports digital signatures may or may not also support encryption and decryption operations.

The Domain Name System (DNS) is a hierarchical distributed naming system for resources, such as those provided by computer servers, connected to the internet. It associates domain names to Internet Protocol (IP) addresses. The DNS thus allows computers and humans to access networked resources using names.

The DNS is organized into "zones", the basic unit of organization of authoritative name data for the DNS. The DNS relies on extensive delegation of such authority. In that respect, the term "child" refers to an entity of record to which a "parent" entity delegates name resolution authority for a domain, or portion thereof. The terms "parent" and "child" are also generally identified with the respective zones.

SUMMARY

According to various embodiments, a method of electronically signing domain name system (DNS) records stored in a zone file for an internet DNS zone is provided. The method includes electronically accessing a plurality of DNS resource records of a DNS zone stored on one or more DNS servers of a distributed DNS database; generating a plurality of leaf nodes from the plurality of DNS resource records; constructing a recursive hash tree from the plurality of leaf nodes, where the recursive hash tree includes a plurality of nodes, the plurality of nodes including a root node and the plurality of leaf nodes, where each node of the plurality of nodes includes either a leaf node or a hash of data including child nodes; storing the root node in a DNS key (DNSKEY) resource record for a zone signing key (ZSK) for the zone; and publishing, in a DNS resource record signature (RRSIG) resource record, validation data including path data from the recursive hash tree, such that a DNS client validates at least one of the DNS resource records using at least the validation data and the root node.

Various optional features of the above embodiments include the following. The method may include obtaining a hash-based signature on data including the ZSK for the zone; and storing the hash-based signature in an RRSIG record associated with the DNSKEY resource record for the ZSK; such that a DNS client validates the ZSK using at least the hash-based signature from the RRSIG record associated with the DNSKEY resource record for the ZSK. The obtaining a hash-based signature may include generating a second recursive hash tree including a leaf node including a set of random numbers. The method may include additionally storing a root node of the second recursive hash tree in a DNSKEY resource record for a key signing key (KSK) for the zone, such that a DNS client validates the ZSK using at least the hash-based signature from the RRSIG resource record associated with the DNSKEY resource record for the ZSK and the DNSKEY resource record for the KSK. Each of the plurality of leaf nodes may include a respective cryptographic hash of a resource record set (RRset) including records from the plurality of DNS resource records. The plurality of DNS resource records may include at least one of: A resource records, AAAA resource records, and DS resource records. The path data may include data sufficient to construct a path through the recursive hash tree up to the root node. The method may include providing validation logic to at least one browser, such that the at least one browser validates at least one of the DNS resource records using at least the validation data and the root node. The plurality of DNS resource records of the DNS zone may include an entirety of DNS resource records for the DNS zone. The data including child nodes may further include respective salt values.

According to various embodiments, a system for electronically signing domain name system (DNS) records stored in a zone file for an internet DNS zone is provided. The system includes an electronic signing computer including at least one electronic processor and at least one electronic persistent memory, the electronic signing computer communicatively coupled to at least one electronic DNS server of a distributed DNS database electronically storing a plurality of DNS resource records of a DNS zone, where the at least one electronic processor is configured to: obtain the plurality of DNS resource records from the at least one electronic server; generate a plurality of leaf nodes from the plurality of DNS resource records; construct a recursive hash tree from the plurality of leaf nodes, where the recursive hash tree includes a plurality of nodes, the plurality of nodes including a root node and the plurality of leaf nodes, where each node of the plurality of nodes includes either a leaf node or a hash of data including child nodes; provide data including the root node to the at least one electronic DNS server for publication in a DNS key (DNSKEY) resource record for a zone signing key (ZSK) for the zone; and provide validation data including path data from the recursive hash tree to the at least one electronic DNS server for publication in a DNS resource record signature (RRSIG) resource record; such that a DNS client validates at least one of the DNS resource records using at least the validation data and the root node obtained from the at least one electronic DNS server.

Various optional features of the above embodiments include the following. The at least one electronic processor may be further configured to: obtain a hash-based signature on data including the ZSK for the zone; and provide the hash-based signature to the at least one electronic DNS server for publication in an RRSIG record associated with the DNSKEY resource record for the ZSK; such that a DNS client validates the ZSK using at least the hash-based signature from the RRSIG record associated with the DNS-KEY resource record for the ZSK. The at least one electronic processor may be configured to obtain the hash-based signature by generating a second recursive hash tree including a leaf node including a set of random numbers. The at least one electronic processor may be further configured to: provide a root note of the second recursive hash tree to the at least one electronic DNS server for publication in a DNSKEY resource record for a key signing key (KSK) for the zone; such that a DNS client validates the ZSK using at least the hash-based signature from the RRSIG resource record associated with the DNSKEY resource record for the ZSK and the DNSKEY resource record for the KSK. Each of the plurality of leaf nodes may include a respective cryptographic hash of a resource record set (RRset) including records from the plurality of DNS resource records. The plurality of DNS resource records may include at least one of: A resource records, AAAA resource records, and DS resource records. The path data may include data sufficient to construct a path through the recursive hash tree up to the root node. The system may include at least one validation logic electronic server communicatively coupled to a computer network, the at least one validation logic electronic server configured to provide validation logic to at least one browser over the computer network, such that the at least one browser obtains and installs the validation logic and validates at least one of the DNS resource records using at least the validation data and the root node. The plurality of DNS resource records of the DNS zone may include an entirety of DNS resource records for the DNS zone. The system may further include the at least one electronic DNS server, where the at least one DNS server is configured to: publish the DNSKEY resource record for the ZSK for the zone; and publish the DNS RRSIG resource record.

Computer readable media embodiments for each of the disclosed system and method embodiments are also contemplated.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide an optimized technique for integrating hash-based signatures into the Domain Name System Security Extensions (DNSSEC). DNSSEC currently specifies three main families of algorithms for signing DNS records: RSA, digital signature algorithm (DSA), and elliptic curve DSA (ECDSA). However, these algorithms may be vulnerable to potential advances in cryptanalysis, including the possible future construction of a practical quantum computer. Known hash-based digital signature techniques may be resistant to such advances; however, such signatures are typically much, much larger than those in the current families, such that implementation of known prior art hash-based digital signatures may be impractical. While signature size may not be a significant issue when adding signatures to relatively large objects such as executable files, it can be an issue when the objects are relatively small, such as DNS resource records, as well as when there are many records requiring signatures. Accordingly, some embodiments provide efficient and compact hash-based digital signatures to data sets, such as DNS resource records. More particularly, some embodiments provide hash-based digital signatures as a new algorithm family for DNSSEC that leverages existing DNSSEC architecture and is reasonably size-efficient, thereby ensuring the security of the DNS. Accordingly, some embodiments solve the problem of protecting the DNS from potential future cryptanalysis attacks, and are therefore unique to the environment of the internet. Nevertheless, some embodiments may be used to sign and validate arbitrary sets of information.

Some embodiments provide signature amortization without requiring architectural change to the DNS. Because known hash-based signatures are very long, some embodiments use amortization to reduce the per-signature size overhead. Rather than signing each object in a data set individually with a hash-based signature algorithm, some embodiments sign a batch of objects, e.g., a plurality of DNS resource record sets, collectively. This approach works particularly well if updates to a dataset are done on a predictable schedule, e.g., all objects are updated and signed twice a day.

Figure 1:
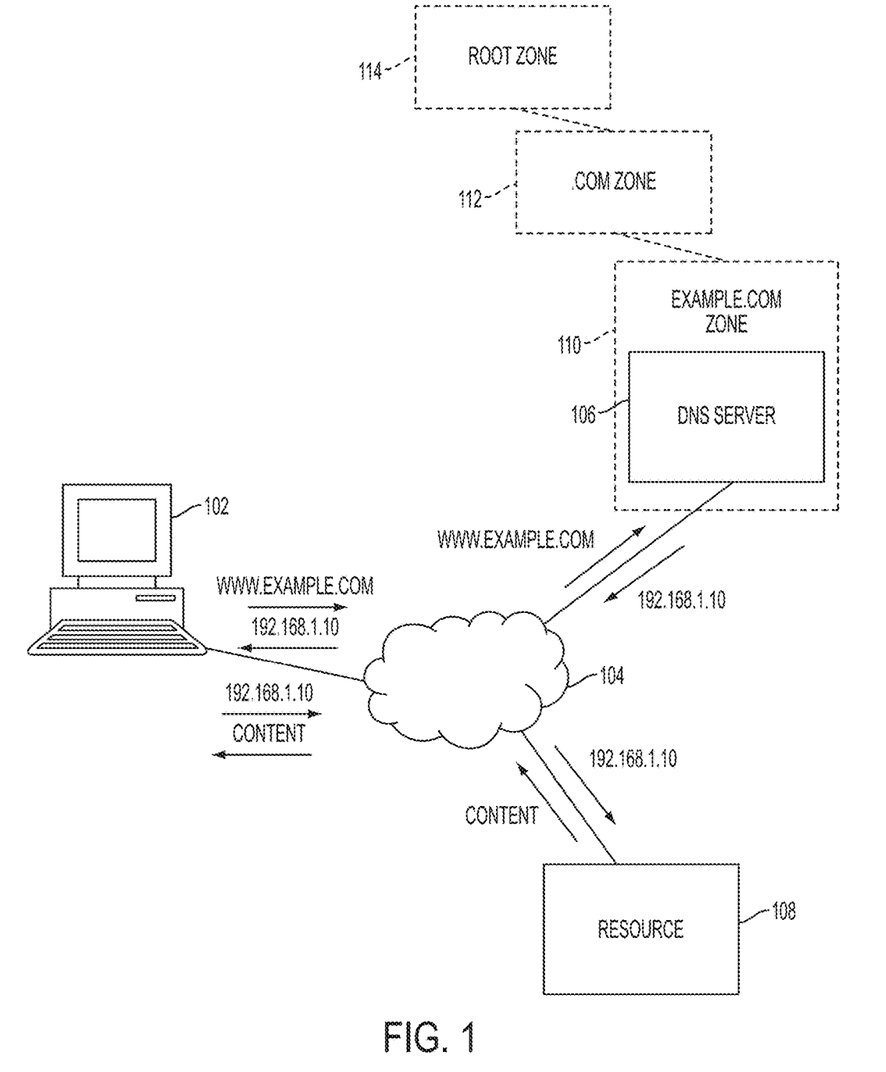
FIG. 1 is a schematic diagram depicting an example DNS interaction with a client.

FIG. 1 is a schematic diagram depicting, by way of background, an example DNS interaction. Note that the interaction depicted by FIG. 1 does not necessarily involve an embodiment of the invention, nor does it explicitly depict validation or authentication mechanisms. Instead, FIG. 1 depicts an overview of one example of how DNS enables the internet to operate using domain names instead of numerical internet protocol (IP) addresses. That is, although networked computers generally rely on numerical locators such as IP addresses, human beings are ill-equipped to memorize such locators. Accordingly, DNS enables humans to rely on easy-to-remember domain names to access resources and data. Nevertheless, the hardware and resources depicted in FIG. 1 may be modified as disclosed herein to implement an embodiment of the present invention in order to confer robust future-proof authentication and validation mechanisms to the DNS. In other words, FIG. 1 depicts a structure in which an embodiment may be implemented.

A user may operate client computer 102. The user may enter a domain name, e.g., www.example.com, in the navigation field of a web browser executing on client computer 102. Client computer 102 operates and/or contacts a recursive DNS server to look up the IP address corresponding to www.example.com. In particular, client computer 102 may send a resource record query to the recursive DNS server. For purposes of this example, the recursive DNS server lacks a resource record for www.example.com. According to the DNS protocol, the recursive DNS server may in this example query the root zone 114 for this record. By way of a DNS name server (NS) resource record, the root server points to a DNS server for .com zone 112, which provides an NS resource record that points to DNS server 106 for the zone for www.example.com, again, relying on an NS resource record. DNS server 106 responds with an appropriate DNS record (e.g., A or AAAA) that includes the requested IP address. Client computer 106 receives the resource record and parses it to extract the IP address. Client computer then contacts the IP address, which leads to resource 108, which may be a server computer. Resource 108 responds with the requested data, e.g., content.

Standing alone, the DNS protocol originally did not include any authentication mechanism for checking the validity of data sent between and from DNS servers. That is, as originally designed, DNS did not include authentication and was therefore exposed to, for example, spoofing and man-in-the-middle attacks. Accordingly, DNS benefits from security provided by the DNSSEC standard, which utilizes digital signatures to establish trust chains.

In general, a trust chain includes a directed series of trust nodes, each of which authenticates the following node in the chain. The first node in a trust chain may be authenticated by an external trust anchor. The last node may be an object that itself does not authenticate anything else, e.g., it may be a key used for encryption rather than signing, or a general-purpose object. The nodes may be implemented as computer-interpretable, electronically stored records that include authentication information, such as a digital signature, public key, digital certificate, or hash (e.g., DNS key or "DNS-KEY", delegation signer or "DS", and/or resource record signature or "RRSIG" records). A relying party who trusts only the trust anchor can authenticate every node in the chain, including an object at the end.

Trust chains are important not only because they provide straightforward, scalable ways for an application to authenticate information throughout a trust hierarchy, but also because they are transferable. An application or relying party can forward a trust chain to another relying party, who can then authenticate the same information itself without further interaction with other services.

A DNSSEC trust chain implemented using asymmetric cryptography starts with a DNSSEC root public key and extends through the DNS hierarchy via a series of digital signatures on DNS records or specific hashes of public keys. The links between nodes within a DNSSEC trust chain take the form of either a public key in one node with a signature by the corresponding private key on the next, or a hash of a public key in one node with the corresponding public key in the next. That is, the records in a DNSSEC trust chain include either public keys for verifying digital signatures on subsequent records, or hashes of public keys of subsequent records. In the former case, a node may be authenticated by verifying its digital signature with a prior node's public key. In the latter case, the node may be authenticated by comparing the hash of its content with a prior node's value.

Figure 2:
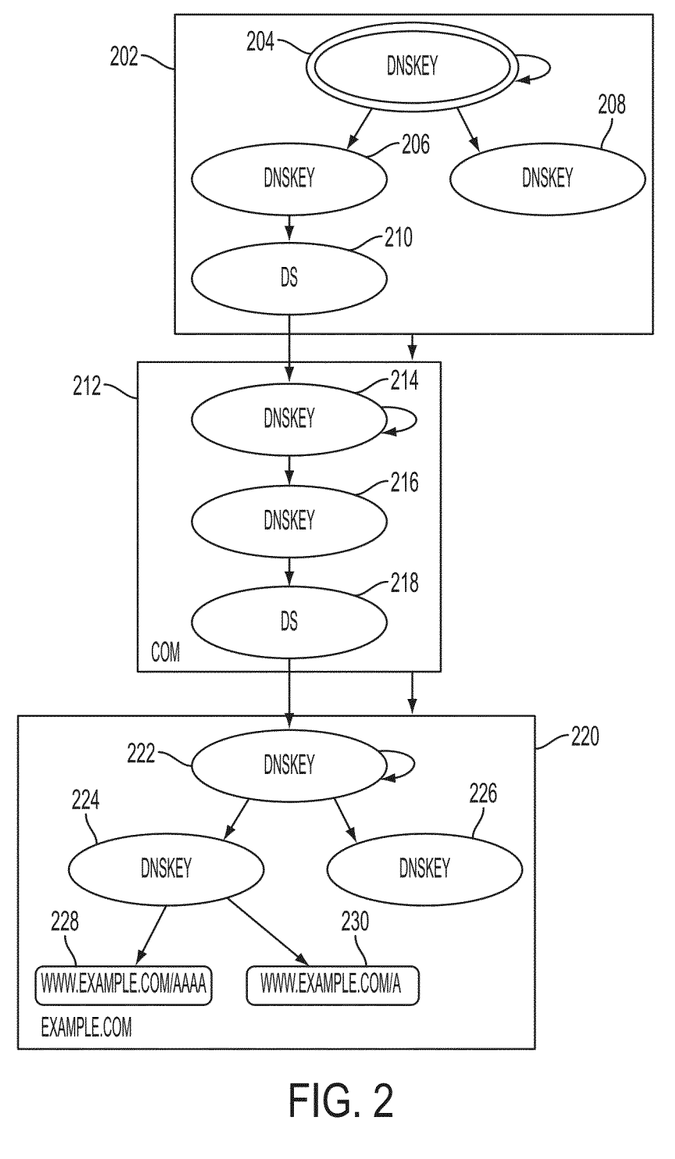
FIG. 2 is a schematic diagram of a DNSSEC trust chain.

FIG. 2 is a schematic diagram of a DNSSEC trust chain. The DNSSEC trust chains in this diagram have a length of nine nodes shown in three groups 202, 212, 220, which correspond to zones 114, 112, 110 of FIG. 1. The nodes 204, 206, 208, and 210 are for the root zone group 202 (records 206 and 208 are alternative second nodes). The first DNS-KEY record 204 is for the root zone's key-signing key (KSK). This KSK also forms part of the external trust anchor. The DNSKEY records 206, 208 are for the root zone's zone-signing keys (ZSKs), which are signed by the private key corresponding to the KSK. In the example, only DNSKEY resource record 206 continues as part of the trust chain. A separate trust chain may be continued from DNS-KEY resource record 208. The third node 210 in this group includes the delegation signer (DS) record for the .com zone's KSK. It is signed by the private key corresponding to the root zone's ZSK, and contains the hash of the .com zone's KSK (see DNSKEY resource record 214, below).

The next group of nodes extends the same pattern to the .com zone group 202. Thus, KSK DNSKEY resource record 214 authenticates ZSK DNSKEY resource record 216 via a digital signature, ZSK DNSKEY resource record 216 authenticates DNS delegation signer (DS) resource record 218 for example.com via a digital signature, and DS resource record 218 authenticates the KSK in the next group 220 by including a hash value of the KSK of the next DNSKEY resource record 222.

The last group of nodes, for the example.com zone group 220, starts with the KSK-to-ZSK pattern (222, 224, 226) and concludes with a ZSK-to-object pattern (224, 228, 230) where the ZSK record 224 authenticates the last node (228, 230) with a digital signature. The last node (228, 230) includes AAAA record 228 and A record 230 for www.example.com. Each is authenticated via a digital signature by the private key corresponding to the example.com zone's ZSK (of record 224). There are thus two trust chains of length nine nodes, one from 204 to 228, and the other from 204 to 230. Both begin with the trust chain of length eight nodes from 204 to 224.

Note that FIG. 2 reflects only a portion of the DNS records that would be present in practice. For example, not shown in FIG. 2 are the name server (NS) records that point to the name server for a zone. In practice, these are also signed by the ZSK for the zone. They are not part of the trust chain from the trust anchor to the object, but are instead part of the trust chain to the name server where the DNS records corresponding to other nodes, including the object, is obtained. Further, FIG. 2 does not show the full array of domains within each zone.

In addition, although it is typical for a zone to have both a KSK and a ZSK, where the parent zone authenticates the KSK node, the KSK authenticates the ZSK node, and the ZSK authenticates object nodes, i.e., three levels of nodes in the trust chain per zone, other arrangements are possible. For example, a zone could have just two levels of nodes, where the parent zone authenticates the ZSK node and the ZSK authenticates object nodes directly. Alternatively, a zone could have more than three levels of nodes, where a parent zone authenticates the KSK node, the KSK authenticates the ZSK node, the ZSK node authenticates another ZSK node, and the other ZSK node authenticates object nodes. By way of non-limiting examples, the techniques presented here may be applied in arrangements with three levels, with more than three levels, and in arrangements with two levels (with the modification that the parent zone authentication information, i.e., the DS record, may be updated when the ZSK changes). Furthermore, although terms such as "ZSK DNSKEY record" and "KSK DNSKEY record" are employed herein, it should be understood that the DNSKEY record is a means of representing a public key, which may take the role of a ZSK, KSK, or another public key depending on the arrangement.

Figure 3:
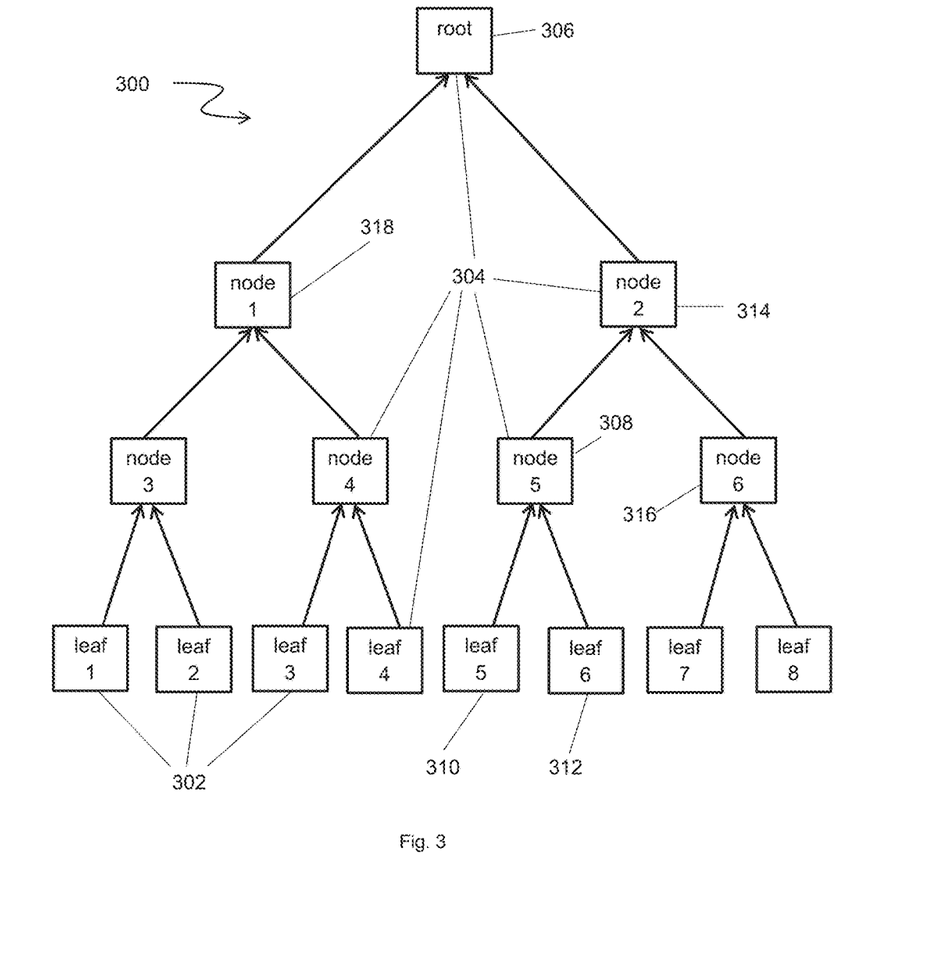
FIG. 3 is a schematic diagram of a recursive hash tree according to some embodiments.

FIG. 3 is a schematic diagram of a recursive hash tree 300 according to some embodiments, i.e., a Merkle tree. As shown in FIG. 3, and for descriptive purposes, recursive hash tree 300 has its "root node" 306 at its apex, and its "leaf nodes", e.g., 302, at its base; thus, the term "below" refers to "down" in the orientation of FIG. 3. (Of course, the orientation depicted is arbitrary, and inverted descriptions are equally applicable.) As used herein, a node's "child nodes" are the nodes that both lie below and are connected to the node at issue. Likewise, two child nodes may lie below and be connected to the nodes' common "parent" node. In general, a recursive hash tree is a (typically binary) tree, each of whose nodes is either a leaf node or a node built from a hash of its child nodes. Recursive hash trees typically have a number of leaves that is a power of two, e.g., 2, 4, 8, 16, etc.

Each leaf node (e.g., nodes 302) of recursive hash tree 300 includes data obtained by applying a hash function (e.g., SHA-2) to a particular object. The particular objects used to generate the leaves depend on the purpose of the recursive hash tree. For example, the method of FIG. 4 uses a recursive hash tree whose leaf nodes are hashes of DNS resource record sets, and the method of FIG. 6 uses a recursive hash tree whose leaves are hashes of sets of random numbers. In more detail, a recursive hash tree such as 300 may be used to generate signatures on objects, such as on one or more DNS resource record sets (RRset). For example, a recursive hash tree constructed from leaves built from resource record sets (RRsets) may be used to generate signatures on the RRsets (see FIG. 5) and to generate data that may be used to validate the signatures (see FIG. 6). Further, a recursive hash tree constructed from leaves built from sets of hashed random numbers may be used to generate signatures on DNSKEY RRsets (see FIG. 7) and to generate data that may be used to validate such signatures (see FIG. 8). These and other techniques are described in detail herein.

Nodes (e.g., nodes 304, 306, 308, 314, 316) of recursive hash tree 300 that are not leaf nodes (e.g., leaf nodes 302, 310, 312) are built from child nodes. More particularly, nodes above the leaf nodes are built by applying a hash function to the contents of their respective child nodes. A node location index and/or a "salt" value (e.g., an included random number) may also be input to the hash function in some embodiments, and/or a different hash function may be employed at different locations in the tree. For example, node 5 (308) contains data resulting from concatenating (or otherwise combining) the data of leaf 5 (310) with the data of leaf 6 (312), and then applying a hash function to the combined data. As another example, node 2 (314) contains data resulting from applying a hash function to the data of node 5 (308) concatenated (or otherwise combined) with the data of node 6 (316).

Digital signatures that utilize recursive hash trees (or that otherwise rely on the irreversibility of cryptographic hash functions for their security, referred to herein as "hash-based" signatures) as disclosed herein are structurally and technically different from the signatures produced by algebraically based asymmetric cryptography, and the data used to validate such signatures are structurally and technically different from the public keys used to validate signatures produced by such asymmetric cryptography. In particular, the tree-based signatures disclosed herein base their security on the irreversibility (preimage resistance) of the hash functions used in their construction. This is in contrast to signature algorithms (e.g., based on RSA, DSA, or ECDSA) that rely on the difficulty of certain algebraic problems for their security. Furthermore, as described in detail herein, the disclosed digital signatures are generated at the same time as the data that serves the same purpose of traditional public keys (e.g., signature validation). This is in contrast to traditional signature algorithms where the public key/private key pair is generated first, and then digital signatures on objects are generated under control of the private key. Here, the public key is generated from the objects directly, and there is no private key. However, in both the traditional case and the techniques disclosed herein, the signatures may be verified with the public key.

Moreover, the signature techniques disclosed herein are resistant to quantum computer attacks, in contrast to signature techniques based on RSA, DSA, and ECDSA, which are susceptible to quantum computer attacks.

Figure 4:
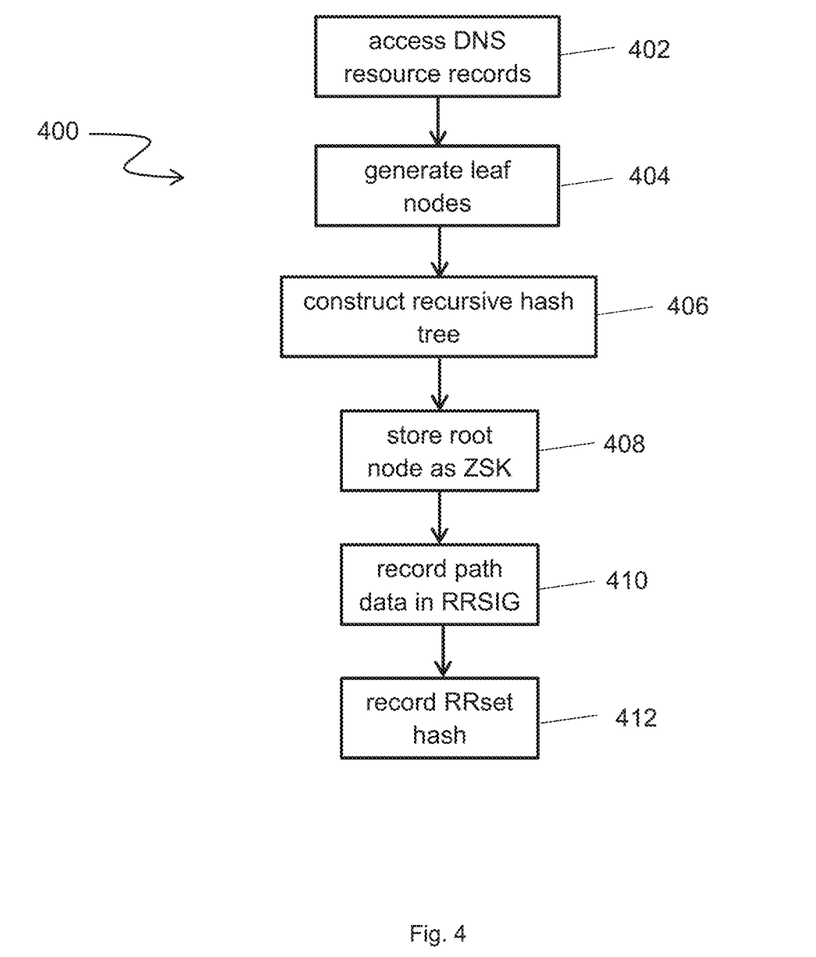
FIG. 4 is a flowchart illustrating a method of generating a zone signing key (ZSK) and signing DNS resource record sets (RRsets) according to some embodiments.

FIG. 4 is a flowchart illustrating a method 400 of generating a zone signing key (ZSK) and signing DNS resource record sets (RRset) according to some embodiments. The method may be implemented by a DNS name server (e.g., DNS server 106 of FIG. 1 or an authoritative DNS name server), or a specialized computer communicatively coupled to such a DNS name server, for example, to produce the disclosed signatures for DNS resource records. Such a specialized computer may include one or more cryptographic co-processors, for example.

At block 402, the method accesses DNS resource records. For the present technique, the method may access a resource record set (RRset), that is, a collection of resource records for a zone of a particular type (e.g., A, AAAA, DS, DNSKEY, NS, etc.). The RRset is typically one of many in a batch of RRsets are signed using this approach. The selected RRsets may be of multiple types or the same type. By way of non-limiting example, the method of FIG. 4 may sign one or more delegation signer (DS) DNSKEY RRsets, and/or one or more A RRsets, and/or one or more additional RRsets, etc. The access may include grouping records electronically into a plurality of RRsets. According to some embodiments, the number of RRsets accessed according to this block and processed according to subsequent blocks may be an integer power of two, or the method may pad the RRsets with dummy or blank RRsets such that the total number including the dummy or blank RRsets is an integer power of two. Thus, the signing operation of FIG. 4 may be applied to a batch of objects to be signed.

At block 404, the method generates leaf nodes from the accessed RRsets. This may be accomplished by applying a hash function to each of the RRsets. Suitable hash functions include cryptographic hash functions, such as by way of non-limiting example, secure hash algorithm 2 (SHA-2). The leaf nodes may be temporarily stored in volatile memory as part of this block, or they may be transferred to persistent memory. A leaf node location identifier and/or a salt value may also be input to the hash function according to some embodiments.

At block 406, the method constructs a recursive hash tree from the hashed RRset leaves. That is, the method treats the hashed RRsets as leaf nodes and builds therefrom a recursive hash tree, e.g., as shown and described in reference to FIG. 3. Thus, pairs of nodes are concatenated (or otherwise combined) and hashed (optionally together with index and/ or salt inputs) in order to obtain parent nodes from child nodes as shown and described in reference to FIG. 3 until the root node is constructed. The recursive hash tree may be temporarily stored in volatile memory before storing all, or parts thereof, in persistent memory.

At block 408, the method stores the root of the recursive hash tree in a ZSK DNSKEY resource record. That is, the method stores the recursive hash tree root where a public key of an asymmetric key pair would normally be stored in a ZSK DNSKEY resource record. Details of how this data is used to validate signatures is disclosed herein, e.g., in reference to FIG. 5.

At block 410, the method stores path data from the recursive hash tree in a resource record signature resource record (RRSIG). This path data will serve as a signature on leaf node data as described presently and in reference to FIG. 5. The particular path data that serves as a signature on data in a certain leaf node is described in detail presently. Define a "sibling node" to a particular node in a recursive hash tree as a node that is connected to the same parent node as the particular node. Thus, for example, nodes 310 and 312 of FIG. 3 are sibling nodes because they are both connected to parent node 308. For a given leaf node in the recursive hash tree under discussion, record the data from sibling of the given leaf node, the data from the sibling of the given leaf node's parent node, the data from the sibling of the given leaf node's parent's parent, and so on, until the method records the data from the sibling node that is a direct parent of the root node. Thus, for example, and in reference to FIG. 3, the following path data is recorded in an RRSIG record as the signature on leaf 5 (310): the data from leaf 6 (312), the data from node 6 (316), and the data from node 1 (318). This path data may be concatenated, possibly using a formatted data structure, and stored in an RRSIG resource record. The path data may also, or alternately, include an identifier of the position of the leaf node in the tree, so as to determine the "left-right" ordering of the concatenations of intermediate values during signature validation as described further next. Because the path data in one signature may include common nodes with path data for another signature, the path data may also be compressed by referencing the location of a common node rather than including path data directly.

At block 412, the method records a hash of the RRset that includes the resource record under consideration, i.e., the method records the leaf node itself. This data may be concatenated with the path data of block 410, and recorded in an RRSIG record. This step is optional, because the hash can be recomputed and confirmed in combination with the path, but may be useful in embodiments as a more immediate confirmation of the hash.

Blocks 410 and optional 412 of FIG. 4 may be repeated for each leaf node. Consequently, each leaf node has associated path data (and possibly a hash value) recorded in an RRSIG resource record, which serves as a signature as shown and described in reference to FIG. 5, below.

It is noteworthy that the ZSK of FIG. 4 is derived from the objects it signs, whereas in conventional signature algorithms, the ZSK is generated first and then applied to the objects it signs afterwards. Further, each batch would have its own ZSK, which may be published in a ZSK DNSKEY resource record when the batch is signed. The records in a batch may identify the appropriate ZSK as they normally do in DNSSEC, namely, in a "keyid" field in an RRSIG resource record. As a result, the method maintains architectural consistency with typical DNSSEC implementations for the purpose of signature validation: an RRset has an associated signature, stored in an RRSIG record; the signature is validated with a public key; and the public key is stored in a DNSKEY record. Thus, DNSSEC validation logic at client computer 102 does not need to be changed according to some embodiments, only the underlying signature algorithm.

Figure 5:
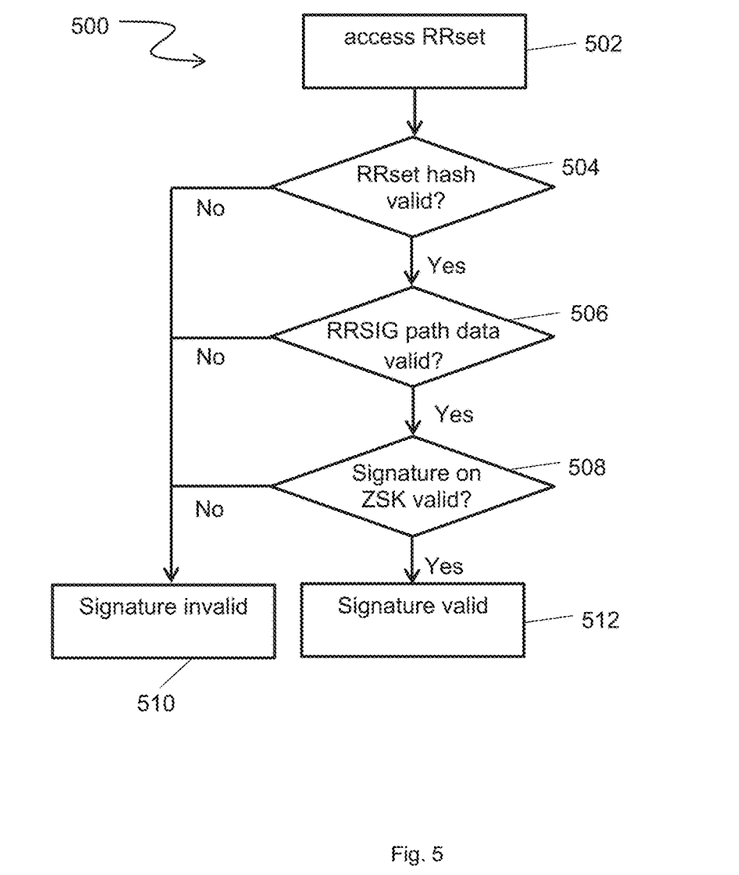
FIG. 5 is a flowchart illustrating a method of validating a signature on a DNS RRset according to some embodiments.

FIG. 5 is a flowchart illustrating a method 500 of validating a signature on a resource record according to some embodiments. The resource record in question may be included in an RRset signed according to the method shown and described in reference to FIG. 4, for example. Thus, the method may validate a signature on a DNS resource record that appears in an RRset that was used to generate a leaf node as part of the process of FIG. 4. Such validation may also consequentially simultaneously validate the other resource records that appear in the RRset, i.e., validate a batch. Note that, in general, method 500 may be implemented by a DNS client (e.g., client computer 102 of FIG. 1 or a browser executing thereon) to validate DNS resource record signatures as disclosed herein as part of a domain name resolution process such as that shown and described in reference to FIG. 1. Such a client computer (or browser) may therefore include validation logic that performs the blocks of FIG. 5.

At block 502, the method accesses an RRset that includes the resource record for which the signature is to be validated. The method may form the RRset anew, or may access it in its totality. The method may access such an RRset by communicating with a DNS server, e.g., an authoritative DNS server, for a respective zone of the resource record, for example.

At block 504, which is optional in some embodiments, the method determines whether the RRset has a valid hash in the respective RRSIG resource record. That is, the method validates an RRset hash on the RRset that includes the resource record in question. As part of this block, the method may apply a hash function to the RRset accessed at block 502 (optionally including an index and/or salt value). The method also accesses the associated RRSIG resource record corresponding to the RRset resource record. The method extracts the hash of the respective RRset from the RRSIG record (e.g., as recorded per optional block 412 of FIG. 4), and compares it to the newly-formed hash of the RRset resource record. If the comparison is positive, i.e., if the data are identical, then the method proceeds to block 506. Otherwise, the method outputs a result indicating that the validation failed, and the method halts at block 510.

At block 506, the method determines whether the RRset has valid path data in the respective RRSIG resource record. As part of this block, the method extracts the respective path data from the RRSIG resource record (e.g., as recorded per block 410 of FIG. 4). The method proceeds to use the path data (as well as the hash of the RRset obtained at block 504) to re-construct a portion of the recursive hash tree up to and including the root. Thus, at the bottom level of the recursive hash tree, the method combines the hashed RRset data of the RRset that includes the resource record to be validated with the hashed RRset data of its sibling node, obtained from the path data. The method hashes the resulting combination, which, if correct, will equal the parent node of both nodes. At each subsequent level of the recursive hash tree, the actions of this block combine the hash so far accumulated with the data of the next respective sibling node as obtained from the path data in the RRSIG resource record (optionally together with an index and/or salt value), and hash the result. The process continues up the tree to the root node. Once the process reaches the root node and confirms that the accumulated hash value matches the hash value at the actual root node (i.e., the ZSK), the process proceeds to block 508; otherwise the process proceeds to block 510, indicates that the signature is invalid, and halts. Thus, according to some embodiments, the only values from the hash tree that the verifier needs in order to verify the signature on the RRset are the path data (which is part of the signature) and the value of the root node, i.e., the ZSK. In such embodiments, the verifier re-constructs other portions of the hash tree but does not need to know their correct values.

As an example of the actions of block 506, and with respect to FIG. 3, in order to validate the path data for leaf node 5 (310), for example, the process of block 506 extracts the value of sibling leaf node 6 (312) from the path data in the respective RRSIG record, combines it with the value of leaf node 5 (310), and hashes the result. The process of block 506 then extracts the value of (now) sibling node 6 (316) from the path data in the respective RRSIG record, combines it with the value of node 5 (308), and hashes the combined value. The process of block 506 next extracts the value of (now) sibling node 1 (318) from the path data in the respective RRSIG record, combines it with the value of node 2 (314), hashes the result, and compares it with the value of the parent, which is the root node 306 at this stage in the process. If the comparison is valid, then the process continues to block 508; otherwise the process proceeds to block 510, indicates that the signature is invalid, and halts.

At block 508, the method determines whether a signature on the ZSK is valid. Example embodiments of this block are shown and described in reference to FIGS. 6 and 7, below. In particular, this block may include validating a one-time hash-based signature per the method shown and described in reference to FIG. 7 below. The one-time hash-based signature may be produced as shown and described in reference to FIG. 6, e.g., based in part on data stored in a key signing key (KSK) DNSKEY resource record. If the signature on the ZSK is validated per block 508, then the method proceeds to block 512, outputs an indication of signature validity, and halts; otherwise the process proceeds to block 510, indicates that the signature is invalid, and halts.

Note that in some embodiments, the actions of block 508 are optional. That is, a signature on an RRset may be validated without validating a signature on the ZSK that was used to sign the RRset, by performing blocks 502, 504, and 506, and omitting block 508, according to some embodiments. Block 508 may serve to complete validation of a chain of trust, however, so it may be included in some embodiments.

Figure 6:
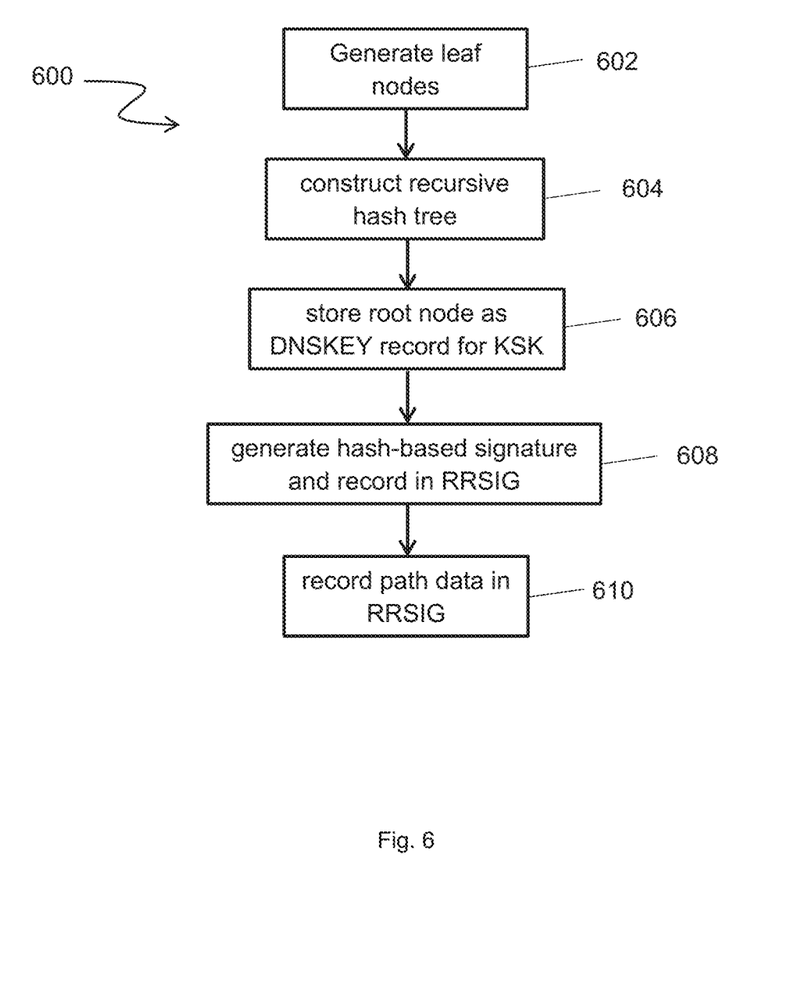
FIG. 6 is a flowchart illustrating a method of signing a zone signing key (ZSK) according to some embodiments.

FIG. 6 is a flowchart illustrating a method 600 of signing a zone signing key (ZSK) according to some embodiments. The ZSK may be a root node of a recursive hash tree, such as that stored at block 408 of FIG. 4. The ZSK may be included in an RRset, and the entire RRset signed as described. The method may be implemented by a DNS name server (e.g., DNS server 106 of FIG. 1 or an authoritative DNS server), or a specialized computer communicatively coupled to such a DNS name server, for example. Such a specialized computer may include one or more cryptographic co-processors, for example.

At block 602, the method generates leaf nodes toward generating a full recursive hash tree. Each leaf node may be generated as follows. Choose a sequence of k random number pairs $(X_{ij})_{1 \leq i \leq k, j \in \{0,1\}}$, where each $X_{ij}$ is, e.g., the same length as a length an output from a hash function H. The number k may also be selected to be the length of an output of a hash function. Next, generate a sequence $(Y_{ij})_{1 \leq i \leq k, j \in \{0,1\}}$, where each $Y_{ij} = H(X_{ij})$. The index values (i,j) and/or a salt value may also be included with the input to the hash function in some embodiments. The sequence $(Y_{ij})_{1 \leq i \leq k, j \in \{0,1\}}$ is a one-time public key and is then used at block 604 as one of the leaves to build a recursive hash tree in the manner shown and described in reference to FIG. 3. Thus, the recursive hash tree is generated by iteratively combining and hashing pairs of nodes until the root of the tree is generated, wherein each leaf corresponds to a one-time public key. The sequence $(X_{ij})_{1 \leq i \leq k, j \in \{0,1\}}$, associated with a leaf node is the corresponding one-time private key.

At block 606, the method stores the root node of the recursive hash tree from block 604 in a DNSKEY resource record for a key signing key (KSK). That is, the method stores the recursive hash tree root where a public key of an asymmetric key pair would normally be stored in a KSK DNSKEY resource record. Details of how this data is used to validate a signature on a ZSK are presented in reference to FIG. 7, below.

At block 608, the method generates a hash-based signature on the ZSK using the recursive hash tree and records it in an RRSIG record for the RRset that includes the ZSK. The one-time signature may be generated as follows. First, select any leaf node of the recursive hash tree that has not previously been used to generate a signature, and let $(X_{ij})_{1 \leq i \leq k, j \in \{0,1\}}$, denote the associated one-time private key. Second, represent the hash of the RRset that includes the ZSK in binary format as the sequence $(b_i)_{1 \leq i \leq k}$. Third, build a signature string $(sig_i)_{1 \leq i \leq k}$ by checking, for each i, whether $b_i$ is 0 or 1. If 0, then define $sig_i$ equal to $X_{i0}$, otherwise define $sig_i$ equal to $X_{i1}$. Fourth, denote sig as the concatenation (or other combination) of the $sig_i$ for $1 \leq i \leq k$. Then sig= $(sig_1 \| sig_2 \| \ldots \| sig_{k-1})$ is a one-time hash-based signature on the RRset that includes the ZSK, where the symbol "$\|$" represents the concatenation operator. Fifth, record sig in an RRSIG record for the RRset that includes the ZSK, e.g., the RRSIG resource record associated with the DNSKEY resource record. The next block will amend the contents of this record to complete the signature on the RRset that includes the ZSK.

At block 610, the method records (a) the one-time public key $(Y_{ij})_{1 \leq i \leq k, j \in \{0,1\}}$, and (b) path data in the RRSIG record for the ZSK. The one-time public key and the path data are concatenated (or otherwise combined) with the one-time hash-based signature sig recorded in the RRSIG record for the RRset that includes the ZSK per block 608. The path data is similar to the path data described in reference to block 410 of FIG. 4. Thus, the path data starts with the sibling node to the node that was used to generate the one-time hash-based signature sig per block 608 above, and includes sibling node data for each successive parent as described in reference to block 410 of FIG. 4. Thus, after block 610, the RRSIG record for the RRset that includes the ZSK includes the one-time hash-based signature sig on the ZSK, as well as the respective path data. As described in connection to FIG. 3, the path data may also (or alternately) include an identifier of the position of the leaf node in the tree. Note that in some embodiments, portions of the one-time public key may be omitted if they can be reconstructed from respective portions of the one-time hash-based signature.

Figure 7:
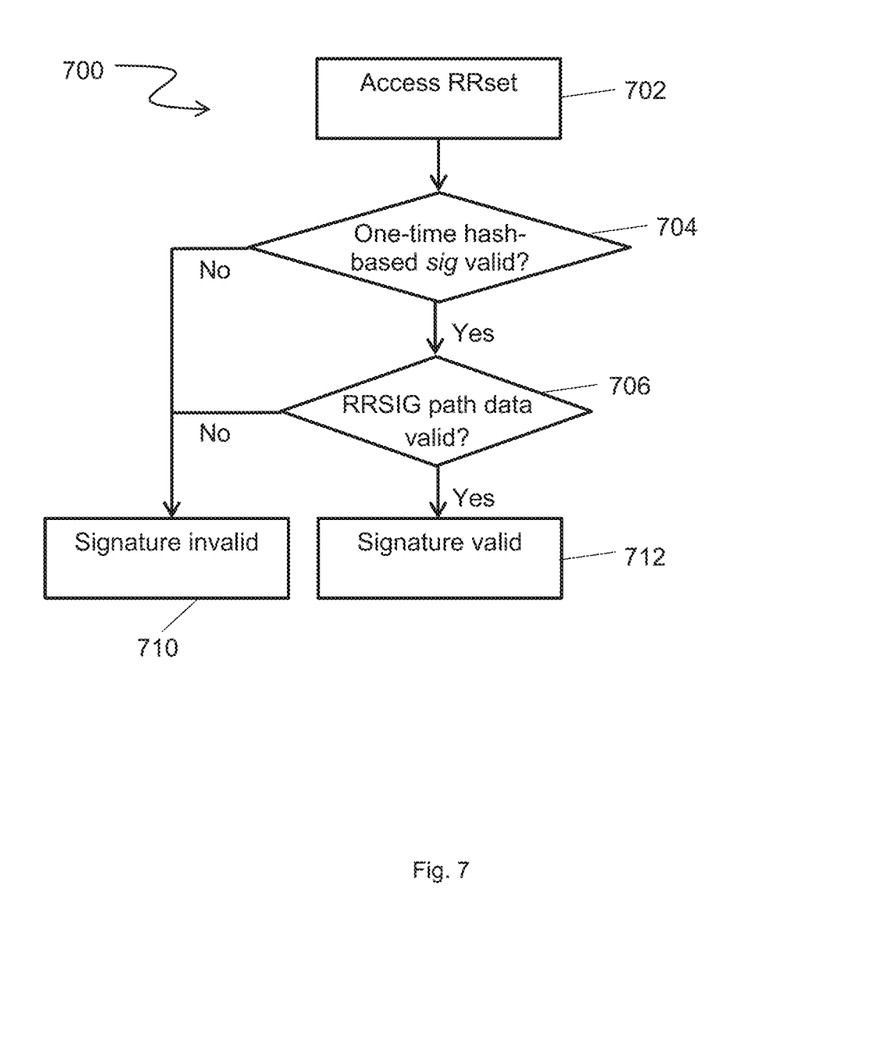
FIG. 7 is a flowchart illustrating a method of validating a signature on a zone signing key (ZSK) according to some embodiments.

The signature produced according to method 600 may be validated using method 700 of FIG. 7, presented below.

FIG. 7 is a flowchart illustrating a method 700 of validating a signature on a zone signing key (ZSK) DNSKEY resource record according to some embodiments. The signature itself may be in a DNSKEY RRSIG record, e.g., as produced according to method 600 of FIG. 6. That is, the ZSK DNSKEY resource record may be included in an RRset signed according to the method 600 of FIG. 6. Such validation may also validate the other resource records that appear in the RRset corresponding to the RRSIG. Note that, in general, method 600 may be implemented by a DNS client (e.g., client computer 102 of FIG. 1, or a browser executing thereon) to validate DNS resource record signatures as disclosed herein as part of a domain name resolution process such as that shown and described in reference to FIG. 1. Such a client computer (or browser) may therefore include validation logic that performs the blocks of FIG. 7.

At block 702, the method accesses a DNSKEY RRset that includes the ZSK resource record for which the signature is to be validated. The method may form the RRset anew, or may access it in its totality. The method may access such an RRset by communicating with a DNS server, e.g., an authoritative DNS server, for a respective zone of the resource record, for example. The method may represent the hash of the RRset as a binary sequence $(b_i)_{1 \leq i \leq k}$.

At block 704, the method validates the one-time hash-based signature on the ZSK. To do this, the method accesses the RRSIG record corresponding to the RRset that includes the ZSK, i.e., the RRset accessed per block 702. The method then parses the record to extract $sig=(sig_1 \| sig_2 \| \ldots \| sig_{k-1})$, which may have been produced according to block 608 of FIG. 6, the one-time public key, and the path data as produced according to block 610 of FIG. 6. Next, for each $1 \leq i \leq k$, the method checks the hash value $H(sig_i)$. That is, for each $1 \leq i \leq k$, the method checks whether the following holds: if $b_i=0$, then $H(sig_i)=Y_{i0}$, otherwise $H(sig_i)=Y_{i1}$. If this holds for all i, then the method proceeds to block 706. Otherwise, the method proceeds to block 710, indicates that the signature is invalid, and halts. Note that in embodiments portions of the one-time public key may be reconstructed from respective portions of the one-time hash-based signature rather than checking them at this block, where the effect of checking is accomplished indirectly through the validation of the path data in conjunction with the reconstructed portions.

At block 706, the method validates the path data stored in the RRSIG record for the ZSK DNSKEY RRset, i.e., the RRset accessed per block 702. The method then parses the record to extract the path data. The actions of this block are similar to those of block 506 of FIG. 5.

Namely, the actions of block 706 use the path data and the hash of the one-time public key to re-construct a portion of the recursive hash tree up to and including the root. Thus, at the bottom level of the recursive hash tree, the method combines the hash of the one-time public key extracted from the signature with the hashed one-time public key of its sibling node, obtained from the path data. The method hashes the resulting combination, which, if correct, will equal the parent node of both nodes. At each subsequent level of the recursive hash tree, the actions of this block combine the hash so far accumulated with the data of the next respective sibling node as obtained from the path data in the RRSIG resource record, and hash the result. The process proceeds up the tree until the root node is reached.

Once the process re-derives the hash value of the root node and confirms that it matches the hash value of the actual root node as stored in the DNSKEY record for the KSK, the process proceeds to block 712, outputs an indication of signature validity, and halts. Otherwise the process proceeds to block 710, indicates that the signature is invalid, and halts.

Other hash-based one-time signature schemes may be combined with a recursive hash tree in some embodiments, and other hash-based signature schemes may also be employed in connection with the KSK and/or for signing the ZSK in variants. In particular, modes such as the eXtended Merkle Signature Scheme (XMSS) and SPHICS are acceptable in terms of their security assurances and efficiency, and would be appropriate alternatives to the scheme described herein.

Figure 8:
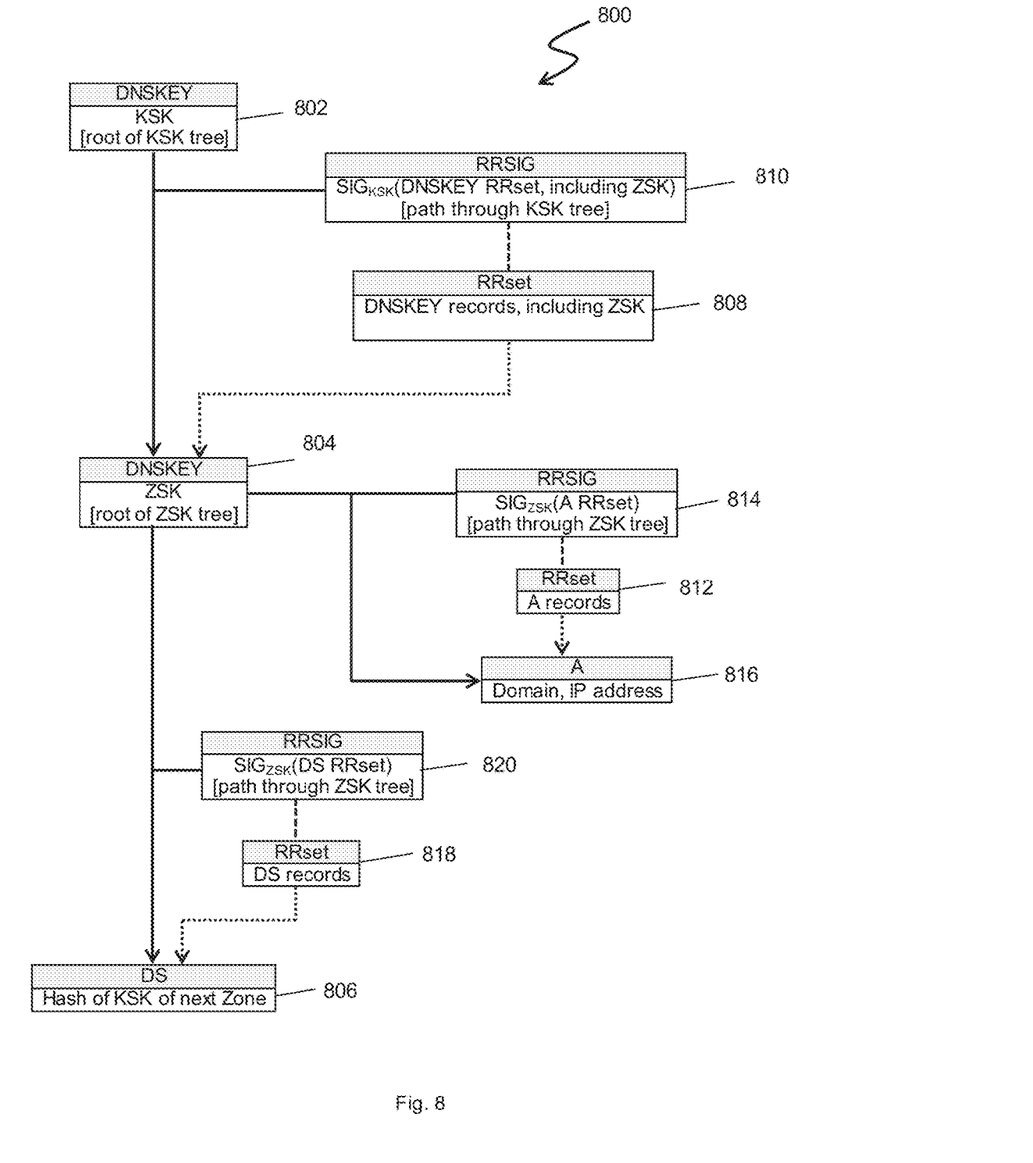
FIG. 8 is a schematic diagram depicting DNSSEC resource records for a zone according to some embodiments.

FIG. 8 is a schematic diagram depicting DNSSEC resource records 800 for a DNS zone according to some embodiments. The resource records depicted in FIG. 8 may be stored in, for example, a DNS zone file, an authoritative DNS name server, or a recursive DNS name server. The dashed lines in FIG. 8 depict associations between resource record sets (RRsets) and their respective resource record signatures (RRSIGs). The dotted lines in FIG. 8 represent inclusion of resource records in their respective RRset.

The resource record signatures, KSK, and ZSK depicted in FIG. 8 may be produced according to the techniques disclosed herein. For example, method 400 of FIG. 4 may be used to produce a signature on an A-type resource record set (RRset) 812 containing A-type resource record 816. The signature, which includes path data for the recursive hash tree whose root is stored in ZSK DNSKEY resource record 804, may be stored in RRSIG resource record 814 associated with A-type RRset 814. As another example, method 400 of FIG. 4 may be used to produce a signature on delegation signer (DS) resource record 806. More particularly, the signature may be on RRset 818, which includes DS resource record 806. The signature may be stored in RRSIG resource record 820 associated with RRset 818 and include path data from the recursive hash tree whose root forms the ZSK. DNSKEY resource record 804 for the ZSK may be formed while signing RRset 818 and/or RRset 812 using method 400; that is, as in the preceding example, the root of the recursive hash tree generated by method 400 may be stored as a ZSK in DNSKEY resource record 804.

Further, method 600 of FIG. 6 may be used to sign DNSKEY resource record 804 for the ZSK. More particularly, the ZSK may be included in DNSKEY RRset 808, which may be signed using method 600 to generate RRSIG resource record 810. RRSIG resource record 810 includes a signature as produced by method 600, including path data and a one-time hash-based signature on the ZSK. Further, method 600 as applied generates a recursive hash tree, whose root is stored as a KSK in DNSKEY resource record 802.

Note that the solid arrows of FIG. 8, which include two originations and a single arrowhead, represent signature validation. More particularly, as described in detail herein (e.g., with respect to FIGS. 6 and 8) the resource record at the head of a solid arrow may be validated using data from the two resource records at the originations of the arrow. Descriptive examples of such validation in the context of FIG. 8 follow.

Method 500 of FIG. 5 may be used to validate the signature of RRSIG resource record 814 on RRset 812, which includes A-type resource record 816. The validation of method 500 may utilize both the root of the respective recursive hash tree as stored in ZSK DNSKEY resource record 804 and the path data in RRSIG resource record 814 to validate the signature of RRSIG resource record 814 on A-type resource record 816, thereby validating A-type resource record 816. As another example, method 500 may be used to validate the signature of RRSIG resource record 820 on RRset 818, which includes DS DNSKEY resource record 806. Per method 500, the root of the generated recursive hash tree as stored as a ZSK in DNSKEY resource record 804, and the respective path data as stored in RRSIG resource record 820, is used to validate the signature of RRSIG resource record 820. This accordingly validates RRset 818 and its contents, including DS DNSKEY resource record 806.

As yet another example of how the disclosed techniques may be used to generate the resource records and the relationships depicted in FIG. 8, method 700 of FIG. 7 may be used to validate ZSK DNSKEY resource record 804 by way of validating the signature of RRSIG resource record 810. That is, RRset 808 includes ZSK DNSKEY resource record 804 and is signed as represented in RRSIG resource record 810. Path data from the recursive hash tree whose root is stored as the KSK in DNSKEY resource record 802 as well as the KSK itself is used, per method 700, to validate the signature of RRSIG resource record 810, thereby validating RRset resource record 808 and its included copy of ZSK DNSKEY resource record 804.

Note that a portion of a zone trust chain appears on the left-hand side of FIG. 8. In particular, KSK DNSKEY resource record 802 may be used (together with other data) to validate ZSK DNSKEY resource record 804, which may be used (together with other data) to validate delegation signer (DS) resource record 806. However, according to some embodiments, the validations are not based on traditional asymmetric cryptography. Instead, the validations utilize recursive hash trees as described herein.

Thus, disclosed embodiments provide long-term protection to DNSSEC in the form of a new hash-based signature algorithm family that will help maintain DNSSEC as a trust mechanism for multiple-purpose information associated with domain names. In contrast, non-optimized known approaches to hash-based signatures involve significant memory usage overhead and may be intractably large if attempted to be used in the context of DNS.

The combination of the method of generating a ZSK, signing RRsets, and validating signatures on resource records described in FIGS. 4 and 5, with the method of signing a ZSK and validating a signature on a ZSK described in FIGS. 6 and 7, can protect against future cryptanalysis by a quantum computer, inasmuch as the security of both signature algorithms depends only on the assumption that a hash function is secure (e.g., preimage resistant, etc.). However, for transitional purposes while hash-based signature algorithms are still being introduced and conventional algorithms are still deployed, it is also possible to combine the method described in FIGS. 4 and 5 with a conventional signature algorithm for signing the ZSK. Indeed, such a combination may coexist with the fully hash-based approach, given that DNSKEY RRsets may be signed with more than one key. For example, a zone may have both a conventional ZSK and a hash-based ZSK per the methods described herein, and a conventional KSK and a hash-based KSK. The DNSKEY RRset for the zone would include ZSKs and KSKs of both types, with signatures of both types. Other RRsets may be signed with either or both types of algorithm (and, following DNSSEC practice, under the control of one or more different ZSKs). This would support both compatibility with client computers implementing the conventional algorithms as well as the introduction of hash-based algorithms.

For technical reasons, DNSSEC specifications currently state that a signature on an object made with a particular signature algorithm under a ZSK is only valid if the ZSK is also signed with the same signature algorithm (indicated by an algorithm identifier). Although the signature algorithms described herein are both hash-based, they are technically not the same, and thus would utilize separate algorithm identifiers when added to DNSSEC. Thus, the combination of algorithms would not pass validation under the current DNSSEC specifications, if their algorithm identifiers were separate. However, it is straightforward to remedy the situation by extending the signature format for each algorithms to include a flag that indicates whether the signature is of the ZSK type or KSK type, or alternatively to infer the type from the type of the key (i.e., its position in the level of nodes in the trust chain). Accordingly, a single algorithm identifier could be employed for both, and the signatures would be accepted as valid by client computers following the conventional DNSSEC architecture (assuming they are upgraded to process the new signature algorithms).

The size advantages of the method described herein is at least partially a result of the batching. Rather than each RRset having a relatively long hash-based signature, the signature would be relatively short, i.e., only the path data. The ZSK would also be short, but its signature would be relatively long. The size overhead of signatures would thus be amortized across the batch. The longer the batch, the less the share of the overhead from the long signature on the ZSK per RRset. A batch could cover the entire zone, which may be convenient if the zone is updated and re-signed only occasionally. Batches could also be organized according to the expected frequency of changes of RRsets. Infrequently changing RRsets could go into one large batch, and frequently changing RRsets into multiple, small batches. The share of the size overhead per RRset would be greater for the small batches, but the time delay from an update to the RRset to the update of the signature would be smaller, because the batch would fill up sooner. An updated RRset could also be put into its own batch if the update needs to be propagated immediately.

Note that whenever a new batch is created and signed, a new ZSK is generated, and added to the DNSKEY RRset for the zone. When the DNSKEY RRset is updated, its associated RRSIG record is also updated. Verifiers will then need to obtain both the new RRset (which would include the new ZSK) and the new RRSIG record. As the number of active ZSKs for the zone grows, the DNSKEY RRset will also grow, imposing a potential overhead on verifiers. Thus, the number of active ZSKs may be selected to be optimal or efficient. For instance, RRsets that were initially organized into small batches could be combined into larger batches, thus reducing the number of active ZSKs over time. Various approaches may be taken to achieve this optimization, including, for example, periodic re-batching and re-signing of RRsets that have already been signed; and parallel batching and signing of RRsets into small batches (for reduced latency) and large batches (for reduced overhead) that would later replace the small batches.

Although some embodiments have been described in terms of DNSSEC, other embodiments may be applied to other protocols where records, their digital signatures, and associated public keys are obtained from online services, and where it is desirable to have an efficient implementation of hash-based signatures.

Some embodiments may be implemented as a feature in various DNS components, e.g., based on BIND, UNBOUND, getdns, etc. The signature validation may be implemented in a client computer stub resolver and/or at a recursive name server. The signature generation may be implemented in an authoritative name server, and/or in a provisioning system that produces the records published by the authoritative name server.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of electronically signing domain name system (DNS) records stored in a zone file for an internet DNS zone, the method comprising:
   electronically accessing a plurality of DNS resource records of a DNS zone stored on one or more DNS servers of a distributed DNS database;
   generating a plurality of leaf nodes from the plurality of DNS resource records by applying a hash function to the DNS resource records;
   constructing a recursive hash tree from the plurality of leaf nodes, wherein the recursive hash tree comprises a plurality of nodes, the plurality of nodes comprising a root node and the plurality of leaf nodes, wherein each node of the plurality of nodes comprises either a leaf node or a hash of data comprising one or more child nodes;
   storing the root node in a DNS key (DNSKEY) resource record for a zone signing key (ZSK) for the zone;
   publishing, in a DNS resource record signature (RRSIG) resource record, validation data comprising path data from the recursive hash tree, whereby a DNS client validates at least one of the DNS resource records using at least the validation data and the root node;
   obtaining a hash-based signature on data comprising the ZSK for the zone using a second recursive hash tree, wherein the hash-based signature is not algebraically based; and
   storing the hash-based signature in an RRSIG resource record associated with the DNSKEY resource record for the ZSK;
   whereby a DNS client validates the ZSK using at least the hash-based signature from the RRSIG resource record associated with the DNSKEY resource record for the ZSK.

2. The method of claim 1, wherein the obtaining a hash-based signature comprises generating the second recursive hash tree comprising a leaf node comprising a set of random numbers.

3. The method of claim 2, further comprising additionally storing a root node of the second recursive hash tree in a DNSKEY resource record for a key signing key (KSK) for the zone, whereby a DNS client validates the ZSK using at least the hash-based signature from the RRSIG resource record associated with the DNSKEY resource record for the ZSK and the DNSKEY resource record for the KSK.

4. The method of claim 1, wherein each of the plurality of leaf nodes comprises a respective cryptographic hash of a resource record set (RRset) comprising records from the plurality of DNS resource records.

5. The method of claim 1, wherein the plurality of DNS resource records comprise at least one of: A resource records, AAAA resource records, and DS resource records.

6. The method of claim 1, wherein the path data comprises data sufficient to construct a path through the recursive hash tree up to the root node.

7. The method of claim 1, further comprising providing validation logic to at least one browser, whereby the at least one browser validates at least one of the DNS resource records using at least the validation data and the root node.

8. The method of claim 1, wherein the plurality of DNS resource records of the DNS zone comprises an entirety of DNS resource records for the DNS zone.

9. The method of claim 1, wherein the data comprising child nodes further comprises respective salt values.

10. A system for electronically signing domain name system (DNS) records stored in a zone file for an internet DNS zone, the system comprising:
   an electronic signing computer comprising at least one electronic processor and at least one electronic persistent memory, the electronic signing computer communicatively coupled to at least one electronic DNS server of a distributed DNS database electronically storing a plurality of DNS resource records of a DNS zone, wherein the at least one electronic processor is configured to:
   obtain the plurality of DNS resource records from the at least one electronic server;
   generate a plurality of leaf nodes from the plurality of DNS resource records by applying a hash function to the DNS resource records;
   construct a recursive hash tree from the plurality of leaf nodes, wherein the recursive hash tree comprises a plurality of nodes, the plurality of nodes comprising a root node and the plurality of leaf nodes, wherein each node of the plurality of nodes comprises either a leaf node or a hash of data comprising one or more child nodes;

provide data comprising the root node to the at least one electronic DNS server for publication in a DNS key (DNSKEY) resource record for a zone signing key (ZSK) for the zone;

provide validation data comprising path data from the recursive hash tree to the at least one electronic DNS server for publication in a DNS resource record signature (RRSIG) resource record;

whereby a DNS client validates at least one of the DNS resource records using at least the validation data and the root node obtained from the at least one electronic DNS server;

obtain a hash-based signature on data comprising the ZSK for the zone using a second recursive hash tree, wherein the hash-based signature is not algebraically based; and provide the hash-based signature to the at least one electronic DNS server for publication in an RRSIG resource record associated with the DNSKEY resource record for the ZSK;

whereby a DNS client validates the ZSK using at least the hash-based signature from the RRSIG resource record associated with the DNSKEY resource record.

11. The system of claim 10, wherein the at least one electronic processor is configured to obtain the hash-based signature by generating the second recursive hash tree comprising a leaf node comprising a set of random numbers.

12. The system of claim 11, wherein the at least one electronic processor is further configured to:
provide a root node of the second recursive hash tree to the at least one electronic DNS server for publication in a DNSKEY resource record for a key signing key (KSK) for the zone;
whereby a DNS client validates the ZSK using at least the hash-based signature from the RRSIG resource record associated with the DNSKEY resource record for the ZSK and the DNSKEY resource record for the KSK.

13. The system of claim 10, wherein each of the plurality of leaf nodes comprises a respective cryptographic hash of a resource record set (RRset) comprising records from the plurality of DNS resource records.

14. The system of claim 10, wherein the plurality of DNS resource records comprise at least one of: A resource records, AAAA resource records, and DS resource records.

15. The system of claim 10, wherein the path data comprises data sufficient to construct a path through the recursive hash tree up to the root node.

16. The system of claim 10, further comprising at least one validation logic electronic server communicatively coupled to a computer network, the at least one validation logic electronic server configured to provide validation logic to at least one browser over the computer network, whereby the at least one browser obtains and installs the validation logic and validates at least one of the DNS resource records using at least the validation data and the root node.

17. The system of claim 10, wherein the plurality of DNS resource records of the DNS zone comprises an entirety of DNS resource records for the DNS zone.

18. The system of claim 10, further comprising the at least one electronic DNS server, wherein the at least one DNS server is configured to:
publish the DNSKEY resource record for the ZSK for the zone; and
publish the DNS RRSIG resource record.

* * * * *